June 14, 1932.  D. SCHON  1,863,505
HAY LOADER
Filed July 12, 1930  7 Sheets-Sheet 1

David Schon
INVENTOR
BY Victor J. Evans
ATTORNEY
WITNESS: J.T.L. Wright

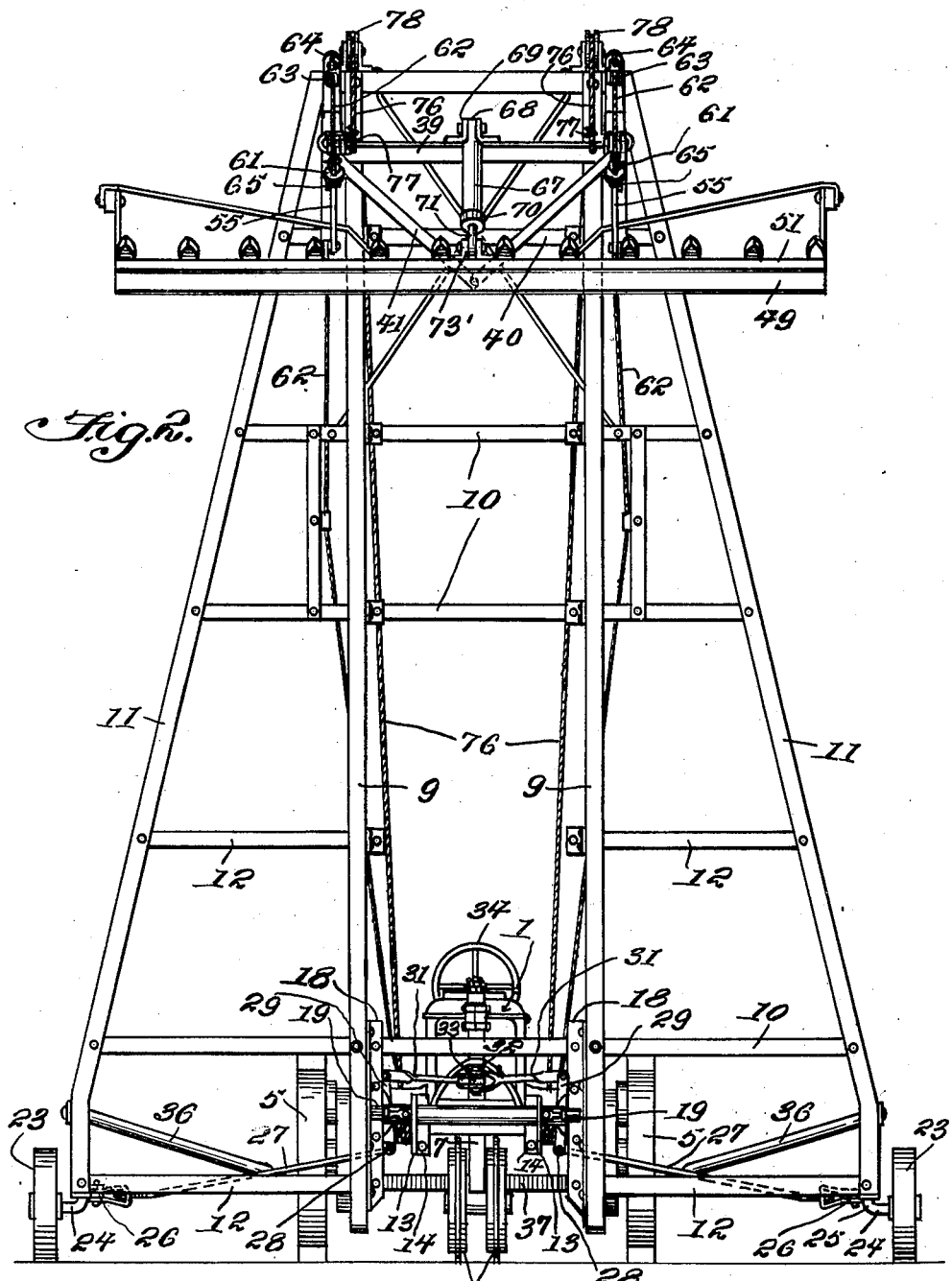

June 14, 1932.  D. SCHON  1,863,505
HAY LOADER
Filed July 12, 1930  7 Sheets-Sheet 3
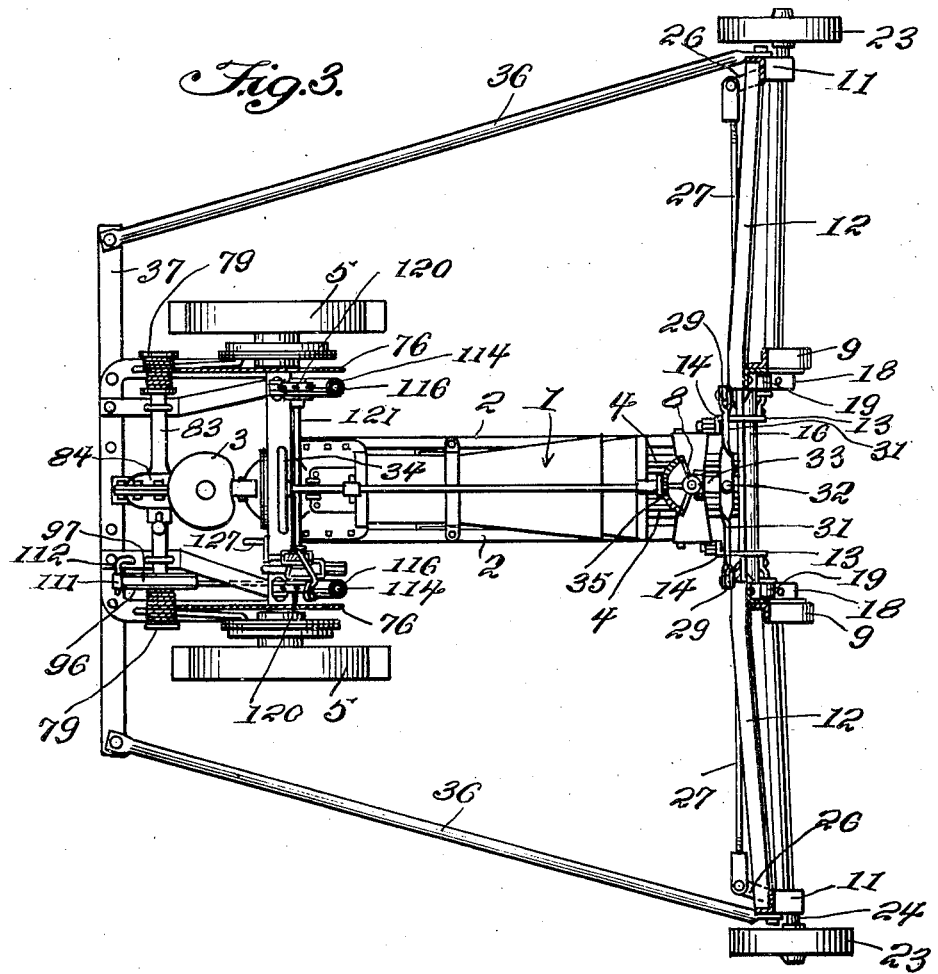
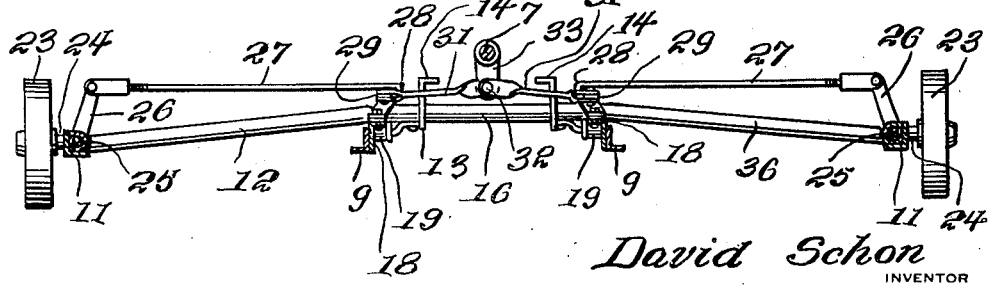
David Schon
INVENTOR
BY Victor J. Evans
ATTORNEY
WITNESS: J.T.L. Wright

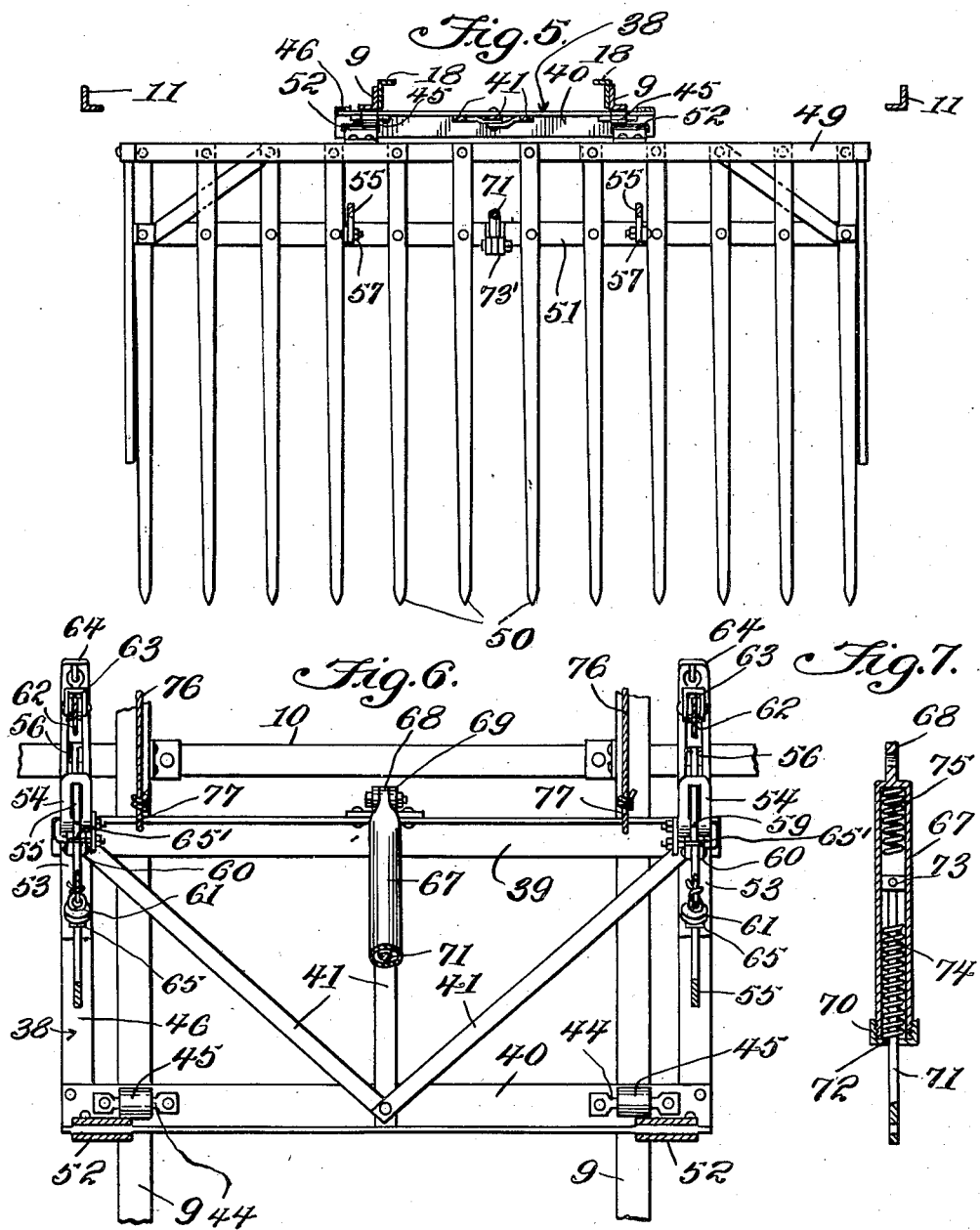

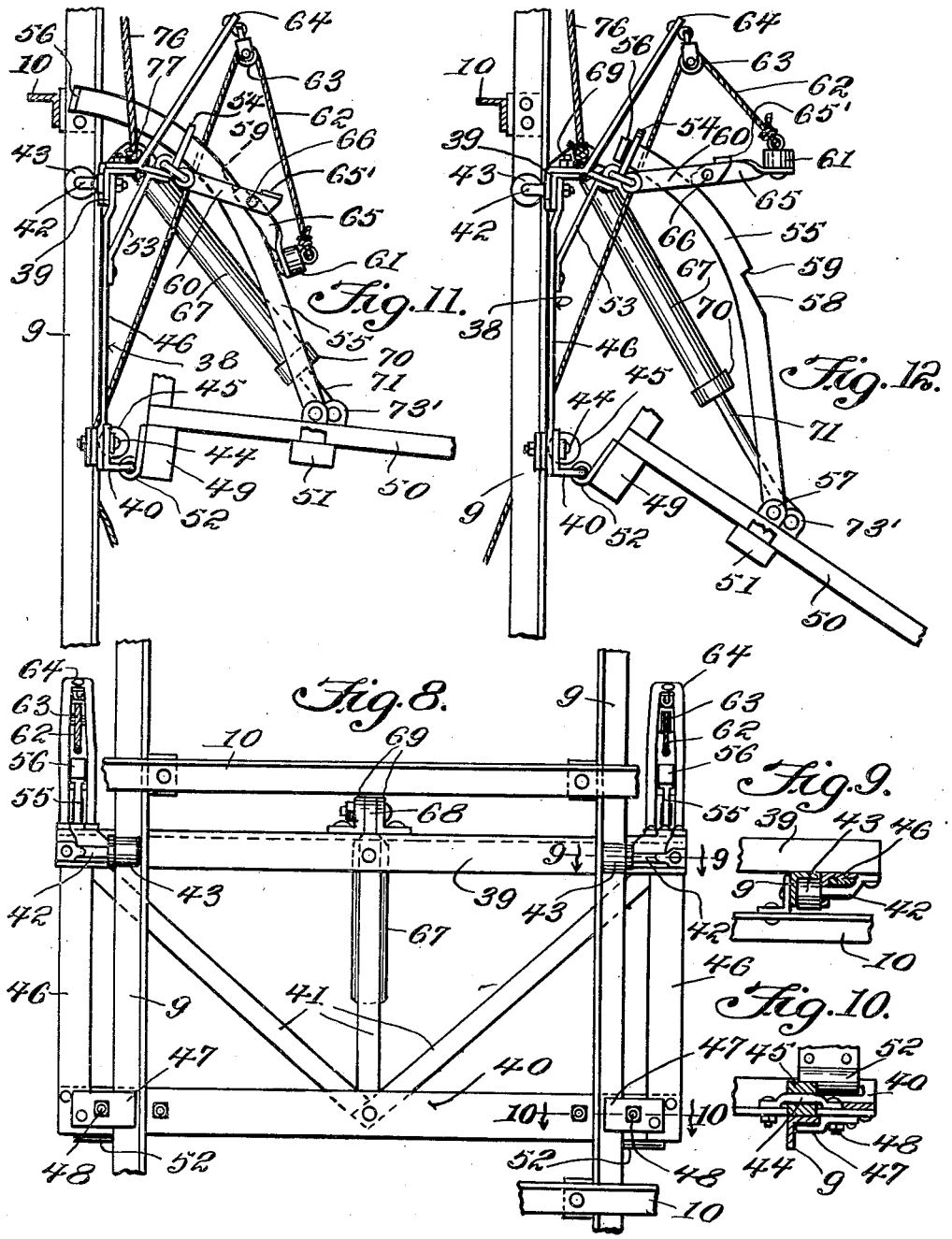

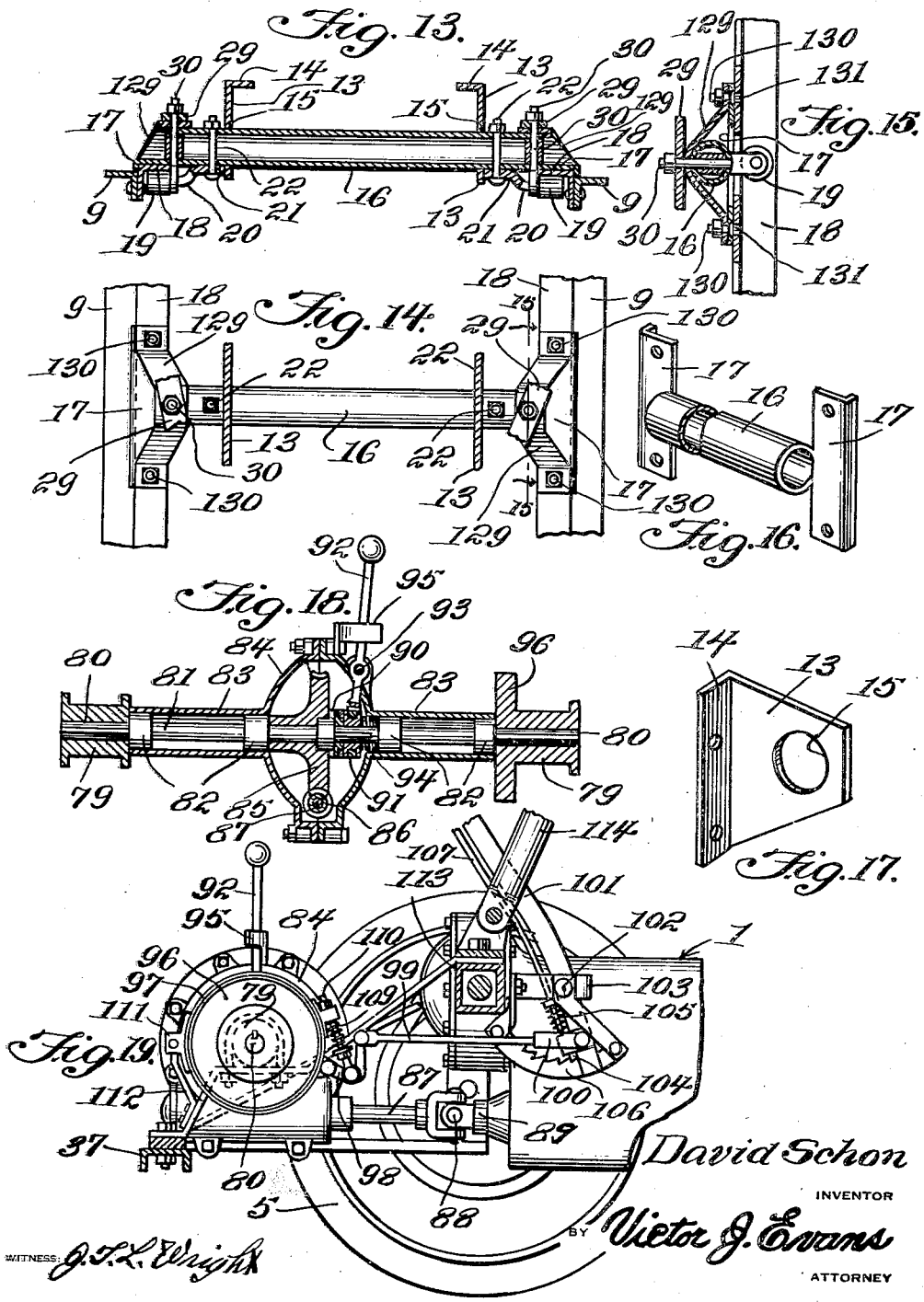

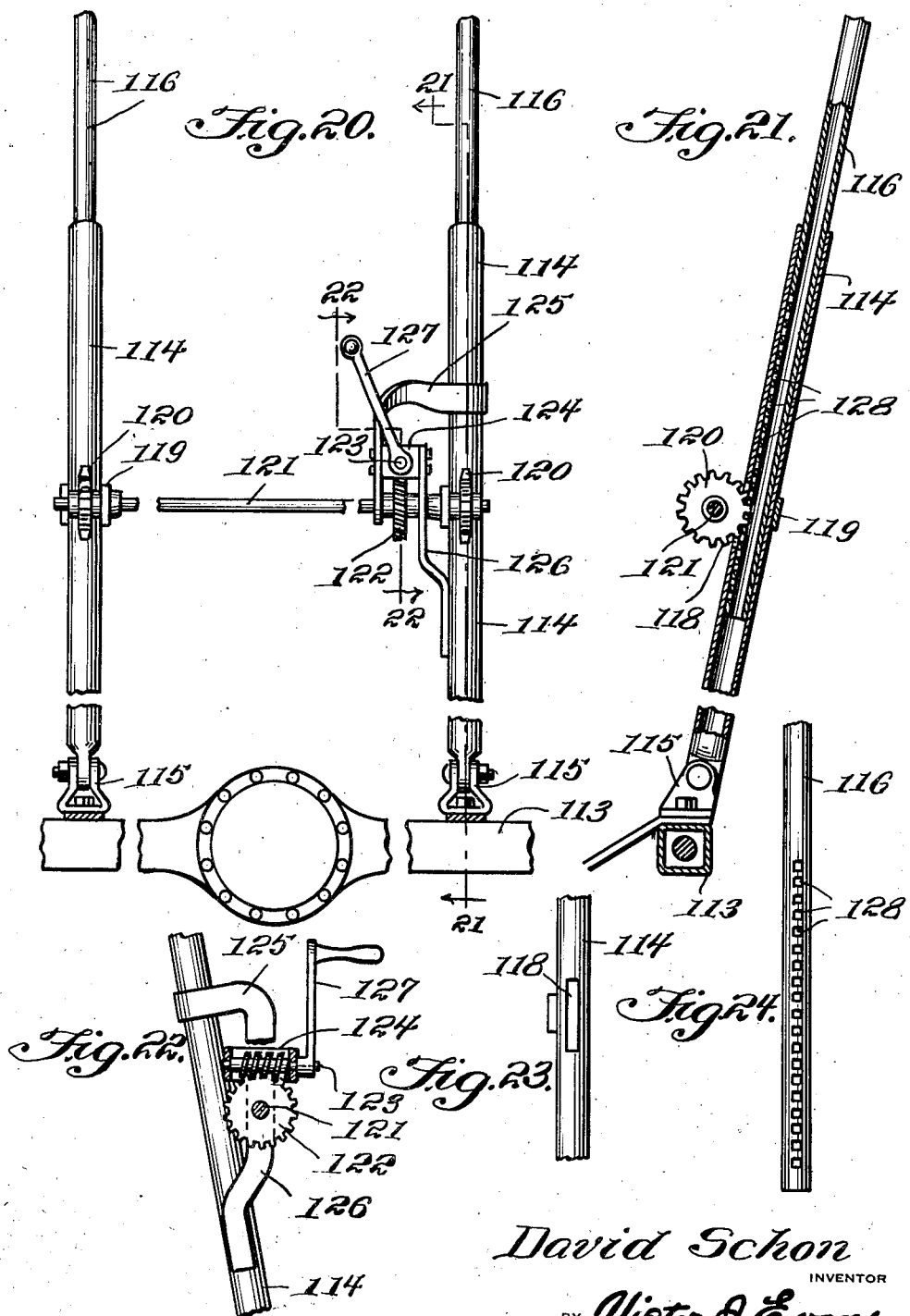

Patented June 14, 1932

1,863,505

UNITED STATES PATENT OFFICE

DAVID SCHON, OF RED OAK, IOWA

HAY LOADER

Application filed July 12, 1930. Serial No. 467,544.

This invention relates to improvements in hay loaders and more particularly to hay loaders of the type which are designed to be mounted upon tractors and the invention has as its primary object to provide a hay loader mechanism which may be readily and conveniently installed upon any ordinary motor tractor and in such a manner as to overcome the chief disadvantage which attends installation of a loader upon a tractor, namely, the liability of the entire assemblage tilting over toward one side or the other while the tractor is being driven over a field or road, and also the liability of a forward overturning of the loader and tractor assemblage when the loading means is operated to elevate the gathered hay, the invention contemplating a loading apparatus so constructed and adapted to be arranged and controlled in such a manner as to preclude any such tilting or overturning as that referred to above.

Another object of the invention is to provide a novel construction of hay lifting rake and more particularly the means for effecting elevation thereof and delivery of the accumulated hay therefrom after the hay has been elevated to the proper position for delivery.

Another object of the invention is to provide a hay loader of this type which will be capable of handling a much greater volume of hay than can be handled by loaders of the ordinary type.

Another object of the invention is to provide a hay loader in which the hay accumulating and lifting rake unit will be mounted for up and down movement along a frame structure and in which novel means is provided for angularly adjusting the said frame structure so that the load accumulated by the rake unit will be imposed upon the tractor in a direct downward direction thus insuring against overturning of the structure either sidewise or in a forward or rearward direction.

This invention also consists in certain other features of construction and in the combination and arrangement of the several parts, to be hereinafter fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several parts, and in which:—

Figure 2 is a front elevation of the loader.

Figure 3 is a horizontal sectional view taken substantially on the line 3—3 of Figure 1, looking in the direction indicated by the arrows.

Figure 4 is a detail plan view, partly in section, illustrating the means providing for the mounting and adjustment of wheels which support the hay loader frame and rake carriage.

Figure 5 is a view partly in section and partly in top plan illustrating the construction of the rake unit and the carriage therefor.

Figure 6 is a view illustrating the carriage for the rake unit and the means for adjusting the same.

Figure 7 is a detail sectional view illustrating a part of the structure shown in Figure 6.

Figure 8 is a view similar to Figure 6 looking at the opposite side of the rake carriage and frame structure.

Figure 9 is a detail horizontal sectional view on the line 9—9 of Figure 8, looking in the direction indicated by the arrows.

Figure 10 is a view similar to Figure 9 on the line 10—10 of Figure 8, looking in the direction indicated by the arrows.

Figure 11 is a view in side elevation illustrating the manner of mounting the rake carriage and also the manner of mounting the rake upon the carriage, and the adjusting means for the rake, the parts being shown in this view in one position of adjustment.

Figure 12 is a similar view illustrating the parts in another position of adjustment.

Figure 13 is a horizontal sectional view illustrating the manner in which the swinging frame for the rake unit is mounted for swinging movement.

Figure 14 is a fragmentary view in front elevation illustrating the supporting means shown in Figure 13.

Figure 15 is a sectional view taken substantially on the line 15—15 of Figure 14.

Figure 16 is a fragmentary sectional perspective view of a part of the structure shown in Figures 13 and 14.

Figure 17 is a perspective view of a bracket which constitutes a part of the structure shown in the said Figures 13 and 14.

Figure 18 is a vertical longitudinal sectional view illustrating a clutch means for use in connection with a cable winding means for elevating the rake unit.

Figure 19 is a view in side elevation illustrating the structure shown in Figure 18 and also a brake unit constituting a part of the mechanism.

Figure 20 is a fragmentary view in elevation illustrating a brace for the frame upon which the rake carriage is mounted and through the medium of which the said frame is angularly adjusted.

Figure 21 is a sectional view taken substantially on the line 21—21 of Figure 20, looking in the direction indicated by the arrows.

Figure 22 is a sectional view taken substantially on the line 22—22 of Figure 20, looking in the direction indicated by the arrows.

Figure 23 is a fragmentary view in elevation of a part of the structure shown in Figure 20.

Figure 24 is a similar view illustrating a part to be assembled with the part shown in Figure 23.

Figure 1:
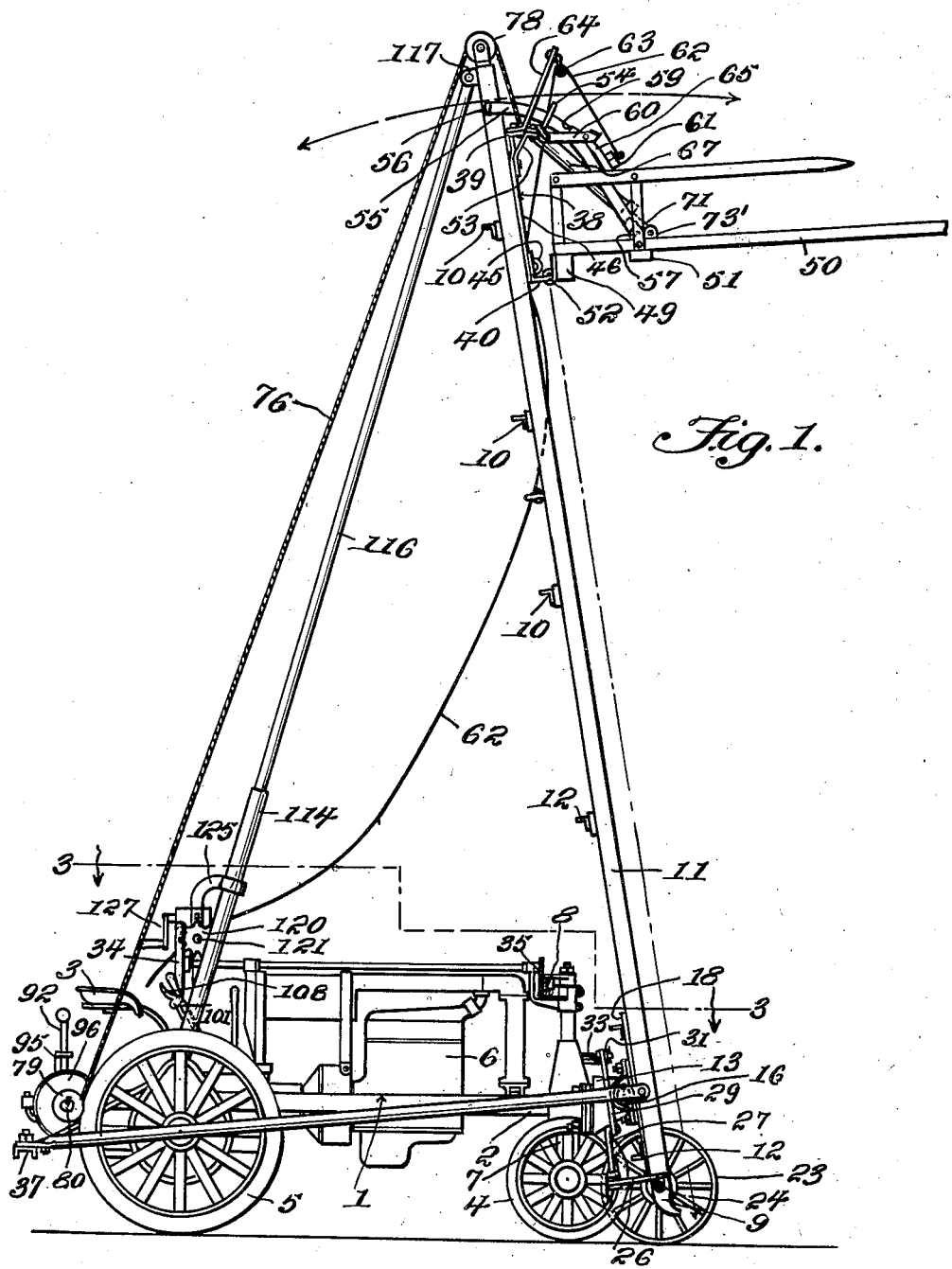
Figure 1 is a view in side elevation of the hay loader embodying the invention, the view illustrating also the tractor upon which the loader mechanism is mounted.

In the drawings, the numeral 1 indicates in general a tractor which may be of the usual construction and the chassis frame of the tractor is indicated by the numeral 2 and the numeral 3 indicates the driver's seat and the numerals 4 and 5 the front and rear wheels of the tractor, and the tractor engine is indicated by the numeral 6.

The tractor wheels 4 are mounted upon a spindle at the lower end of an upright 7 and the numeral 8 indicates in general a means which is ordinarily provided for rotatably adjusting the upright 7 in steering the tractor.

The frame structure upon which the devices of the invention are mounted includes a frame comprising spaced side members 9 which are parallel to each other and braced at intervals by horizontal cross bars 10, this frame further including downwardly and outwardly inclined bracing frame members 11 braced with respect to the frame members 9 by extensions of the cross frame members 10 or by other frame members 12. The numeral 13 indicates bracket members which are of the form shown in Figure 17 and which are provided with attaching flanges 14 secured to the front of the chassis frame 2 of the tractor, and mounted in openings 15 in these bracket members is a tubular member 16 which is formed at each end with an attaching portion 17 disposed against the rear side of a respective one of the uprights 9 slidably disposed against an angle iron guide 18 riveted or otherwise secured to a respective one of the members 9.

A roller 19 is rotatably mounted upon a spindle 20 which is provided with an attaching portion 21 secured by a bolt 22 to the forward side of the member 16 and these rollers travel against the other sides of the said guides 18, and preferably the attaching portions 21 of the spindles 20 are in contact with the brackets 13 so as to prevent any displacement of the member 16 in the openings 15 in the said brackets 13. In this manner the lower end of that portion of the frame structure which comprises the members 9, is connected with the forward end of the chassis frame of the tractor for upward and downward displacement of the tractor wheels 4 with respect to wheels 23 which support the frame structure comprising the members 9, 10 and 11, in travelling over inequalities in the ground surface. The wheels 23 are mounted upon spindles 24 having upright stems 25 which are mounted for turning movement in suitable bearings arranged at the lower ends of the brace frame members 11, and arms 26 extend rearwardly and inwardly at an angle from the stems 25, and rods 27 are connected to the rear ends of these arms and at their inner ends are connected as at 28 to rock arms 29 which are mounted upon bolts 30 fitted through the ends of the tubular member 16, connecting bars 31 being connected at their outer ends to the upper ends of the rock arms 29 and at their inner ends as at 32, to an arm 33 which is movable with the upright 7 so that, when the steering wheel 34 is rotated to cause adjustment of the tractor wheels 4, the wheels 23 for the frame structure of the invention will be correspondingly adjusted, a suitable gear train 35 being provided for this purpose.

Brace members 36 are preferably connected to the frame members 11 at the lower ends thereof and extend rearwardly in converging relation to each other and are connected at their rear ends to the rear cross bar 37 of the tractor chassis frame, in a manner to permit of up and down movement of the frame 9 as the wheels 23 ride over the ground surface.

The carriage for the rake of the loader is indicated in general by the numeral 38 and comprises upper and lower cross members indicated by the numerals 39 and 40, respectively, and a bracing member 41. Bearing members 42 are mounted upon the upper cross member 39 and rollers 43 are journalled in these bearing members and ride against the rear sides of the flanges of the frame members 9, and bearing members 44 are mounted upon the lower frame member 40 of the carriage and rollers 45 are mounted in these bearing members and ride against the forward sides of the respective frame members 9. The frame members 39 and 40 are connected at their ends by upright side members 46, and plates 47 are secured by bolts 48 to the lower ends of the members 46 and have their end portions offset to engage behind the flanges of the respective frame members 9 so that in this manner the frame structure 38 is mounted for vertical travel between and upon the frame members 9 and held against any tilting adjustment with respect thereto.

The rake comprises a head 49 and teeth 50 which extend forwardly therefrom in spaced relation to one another and which are braced by a transverse brace bar 51. Hinges 52 are provided for hingedly connecting the head 49 with the lower cross member 40 of the rake carriage, and it will now be evident that the rake may be snugly adjusted so as to assume the full elevated position shown in Figure 11, or the lowered and downwardly tilted position shown in Figure 12.

A bracket 53 is mounted upon each of the frame members 46 and has an upstanding portion 54 through which is slidably engaged an arcuate arm 55 provided at its upper end with a laterally projecting flange 56, this end of the arm being slidably fitted through a slot formed in the extension 54, and the flange 56 being engageable against the said extension when the rake is swung to the lowered position shown in Figure 12 and the arms 55 are pivotally connected at their lower ends as at 57 to the rake at the ends of the cross piece 51 and each arm is formed in its convex edge with a notch 58 which provides a shoulder 59 pivotally mounted at one end upon each of the bracket extensions 54 and has an arm 60, and these arms extend beside the respective ones of the arms 55 and are connected by a cross piece 61. Cables 62 are connected to the ends of the cross piece 61 and are led over pulleys 63 mounted at the upper ends of brackets 64 mounted upon the top frame member 39, and these cables are, as shown in Figure 1 led downwardly and to a point adjacent the driver's seat 3. A pawl 65 is pivotally mounted as at 66 upon each of the arms 60. These pawls rest by gravity in engagement with the convex edges of the arcuate arms 55. Assuming that the rake and the parts associated therewith are in a position such as shown in Figure 12 and, by a means to be presently described, the rake is swung upwardly to the position shown in Figure 11, the arms 55 will ride through the slots in the extensions 54 and, eventually the pawls 65 will engage against the shoulders 59 of the respective arms as shown in Figure 11, thereby preventing backward sliding movement of the arms and preventing downward swinging movement of the rake.

The rake is thus adjusted after the carriage 39 has been permitted to travel downwardly along the frame members 9 so that the rake teeth are moved over the ground surface to accumulate hay which has been mown and, by means which will presently be described, the rake is then caused to travel upwardly along the frame structure until the hay accumulated thereon has been brought to the desired elevation and, after the rake has been brought above the rack, cart, or other place where it is to be deposited, a pull may be exerted by the driver of the tractor, upon the cables 62, thus swinging the arms 60 upwardly so as to disengage the pawls 65 from the shoulders 59, each pawl being provided at its upper side with a lateral flange 65' which engages the upper edge of the respective arm 60 to limit the pivotal movement of the pawl.

In order to cushion the downward movement of the rake to the position shown in Figure 12 and its swinging movement to the position shown in Figure 11, a shock absorbing means is provided, which means comprises a tubular housing 67 closed at one end and provided at its said end with an ear 68 which is pivotally connected to an attaching bracket 69 upon the frame member 39 midway between the ends thereof. A cap member 70 is fitted to the other end of the housing 67, and a stem 71 is slidably fitted through an opening 72 in the cap 70 and this stem is provided at its inner end with a head 73 which fits slidably in the housing. The stem is pivotally connected at its outer end as at 73' to the cross bar 51 of the rake. A compression spring 74 is arranged within the housing 67 and bears between the cap 70 and head 73.

A compression spring 75 is likewise arranged within the housing and bears between the closed end of said housing and the head 73, and it will now be evident and particularly by a comparison of Figures 11 and 12 of the drawings that when the rake unit is swung upwardly to the position shown in Figure 11, the plunger of the cushioning device, comprising the stem 71 and head 73 will be moved upwardly into the housing 67 thus compressing the spring 75, and this upward movement of the stem and head will be of course yieldably resisted by the spring so that the swinging movement of the rake to the position stated will be cushioned. On the other hand, when the rake is released and permitted to drop or swing downwardly to the position shown in Figure 12 a pull will be exerted upon the stem 71 thus causing the head 73 to exert pressure against the spring 74 to cushion the downward swinging movement of the rake.

The means, above referred to, for effecting upward and downward movement of the rake supporting frame, comprises cables 76 which are connected as at 77 to the top cross member 39, and these cables are led upwardly and over pulleys 78 mounted at the top of the frame structure comprising the members 9, 10 and 11. From the pulleys 78, the cables 76 are led downwardly, rearwardly, and about drums 79 which are keyed to the ends 80 of a shaft 81 which is mounted in bearings 82, in turn mounted in tubular extensions 83 of a gear casing 84.

A worm gear 85 is mounted upon the shaft 81 within the casing 84 and meshes with a worm 86 which is upon the rear end of a shaft 87 connected by a universal joint 88 for accurate alinement with the shaft 89 driven by the engine 6 of the tractor. One member 90 of a clutch is associated with the worm gear 85, and the other member of the clutch, indicated by the numeral 91, is splined upon the shaft 81 and shiftable into and out of engagement with the member 90 through the medium of a shift lever 92 mounted as at 93 for rocking movement upon the gear casing 84. A tension spring 94 is arranged upon the shaft and bears against one of the bearings 82 and against the clutch member 91 so as to urge the clutch member 91 into engagement with the clutch member 90, and in order that the clutch member 91 and the shift lever 92 therefor may be so held as to maintain the clutch member 91 out of engagement with the member 90, a resilient latch member 95 is mounted upon the gear casing 84 and is engageable by the lever 92, in the shifted position of the lever to shift the clutch member 91 out of engagement with the said member 90. It will be evident, at this point, that when the clutch lever 92 is operated to clutch the worm gear 85 with the shaft 84, rotary motion will be imparted to the said shaft 81 and the cables 76 will be wound upon the drums 79 thus causing upward travel of the rake frame along the frame members 9.

In order that, when the clutch lever 92 is shifted to disengage the clutch member 91 from the clutch member 90, and the shaft 81 is free to rotate to permit unwinding of the cables 76 from the drums 79 due to the weight of the rake and its supporting frame, the downward travelling of the supporting frame may be retarded and thus prevent impact of the rake with the ground, a brake means is provided and comprises a brake head 96 which constitutes one head of one of the cable winding drums 79, and the brake band 97 is disposed about the head 96 and connected at one end to one arm of an angle lever 98 which is mounted in any suitable manner in juxtaposition to the head 96, and a rod 99 is pivotally connected at one end to the other arm of an angle lever, and at its other end to a yoke 100 mounted at the lower end of a brake lever 101. This brake lever 101 is mounted as at 102, for rocking movement, preferably upon a bracket 103 extending from a part of the chassis frame of the tractor, and a pawl 104 is yieldably urged by a spring 105 into engagement with a segmental rack 106 likewise mounted upon the chassis frame, a rod 107 being connected at its lower end with the pawl 104 and being led upwardly beside the lever 101 and connected with an operating handle 108 mounted at the upper end of the lever 101 and in juxtaposition to the hand grip for the lever and the said lever 101 is located, as will be observed by reference to Figure 1 of the drawings, in close proximity to the driver's seat 3.

It will be understood of course that when the lever 101 is swung in one direction, the angle lever 98 will be so rocked as to tighten the brake band 97 about the head 96 and, when the lever is swung in the reverse direction, a tension spring 109 which is mounted upon the stem 110 extending between the pivot for the angle lever and a lug upon one end of the brake band 97 will operate to expand the band. The brake band may be supported by a bracket 111 mounted thereon and the bracket in turn pivotally mounted upon an upstanding bracket 112 mounted upon the chassis frame of the structure.

As before stated, it is one of the most important objects of the invention to provide means whereby the weight of the hay gathered may be imposed in a downward direction upon the tractor so as to avoid any tilting or overturning of the tractor and loader in either sidewise direction or forwardly or rearwardly, and therefore the invention contemplates the provision of means for rearwardly tilting the frame structure upon which the frame for the rake is mounted. This means comprises a pair of telescopic units extending between the rear axle housing 113 of the tractor, and the top of the frame structure upon which the rake frame is mounted and each of these telescopic units comprises a lower tubular member 114 pivotally connected by a bracket 115 with the said axle housing 113 and a tubular member 116 which is telescopically fitted into the member 114 and connected at its upper end, pivotally, to a bracket 117 at the top of the said supporting frame for the rake frame.

The member 114 is formed with a slot 118 and bearing brackets 119 are mounted upon the members 114 and gears 120 are fixed upon the shaft 121 which is journalled in the said brackets 119. A worm gear 122 is fixed upon the shaft 121 and a worm shaft 123, which is journalled in bearings 124 supported by brackets 125 and 126 mounted upon one of the members 114 and meshes with the worm gear 122, the brackets 125 and 126 and the bearing 124 and shaft 123 together with the gear 122 being preferably mounted adjacent the right hand one of the telescopic units so that a crank handle 127 which is fixed upon the shaft 123, may be readily grasped and manipulated by the driver of the tractor. The teeth of the gear 120 are in mesh with a series of openings 128 formed in one side of the right hand telescopic member 116, and it will now be evident that when the crank handle 127 is rotated in a direction to cause rotation of the gear 120 toward the right in Figure 21 of the drawings, the gears 120 upon the shaft 121 will, being in mesh with the rack teeth 128 of the telescopic members 116, cause downward telescopic movement of these members into the members 114 thereby causing a shortening of the telescopic units and a downward and rearward swinging of the frame structure upon which the rake frame is mounted, thereby bodily moving the rake, upon which a load of hay has been accumulated, to a position substantially nearly vertically above the tractor.

What I claim is:

1. In a loading apparatus of the character described, in combination with a tractor, a vertically disposed frame mounted at the forward end thereof, a rake carriage movable on said frame, means operated from the motor of the tractor for imparting upward movement to the rake carriage, and releasable to permit downward movement of the rake carriage, a rake pivotally mounted on the carriage, means for controlling the movements of the rake, comprising a tubular member pivotally connected with the carriage, a stem pivotally connected with the rake and having a head slidable within the tubular member, and compression springs within the tubular member and located at opposite sides of said head of the stem.

2. In a loading apparatus of the character described, in combination with a tractor, a vertically disposed frame mounted at the front thereof for forward and rearward swinging movement, a rake carriage movable longitudinally of the frame, a rake supported on the carriage for vertical swinging movements, means for controlling the movements of the rake, and manually operable means for tilting said frame, comprising a brace including telescopically associated sections connected respectively to the frame and tractor, a rack extending longitudinally of one section of the brace, a gear upon the other section of the brace meshing with the rack, and means for rotating the gear.

3. In a loading apparatus of the character described, in combination with tractor, a vertically disposed frame mounted at the forward end thereof, a rake carriage movable longitudinally on said frame, a rake swingingly mounted on said carriage, means for guiding said rake in its movements, and limiting the movement of the rake in one direction, said means including a pair of arcuate-shaped arms pivotally connected with the rake and movable therewith, and means cooperating with said arms for holding the rake and said arms normally elevated.

4. In a loading apparatus of the class described, in combination with a tractor, a vertically disposed frame mounted at the forward end thereof, a rake carriage movable longitudinally on the frame, a horizontally disposed rake pivoted on the carriage for vertical swinging movements, means for guiding the rake in its movements and limiting the movement of the rake downwardly to one of its positions, said means including slotted brackets supported by the carriage, a pair of arcuate-shaped arms slidable through said brackets and having corresponding ends pivotally connected with the rake, stop flanges formed on the opposite ends of said arms, and means cooperating with said arms for normally holding the rake and said arms elevated.

5. In a loading apparatus of the character described, in combination with a tractor, a vertically disposed frame mounted at the forward end thereof, a rake carriage mounted for sliding movement on said frame, a horizontally disposed rake swingingly mounted on said carriage, means for guiding the rake in its movements, and limiting the movement of the rake in one direction, said means including a pair of arcuate-shaped arms movable with said rake and pivotally connected therewith, means for cushioning the movements of said rake, and means cooperating with said arms for holding said rake and arms in their normal elevated positions.

6. In a loading apparatus of the character described, in combination with a tractor, a vertically disposed frame mounted at the forward end thereof, a rake carriage mounted for sliding movement on the frame, a horizontally disposed rake pivotally mounted on the carriage, means for guiding said rake in its movements, and limiting the movement of the rake in one direction, said means including a pair of arcuate-shaped arms pivotally connected with the rake and movable therewith, the outer edge of each arm having a notch formed therein, a pair of pivotally mounted pawls engaging said edges of the arms and adapted to be received by said notches to hold the rake and arms in their normal elevated positions, means for cushioning the movements of said rake, and means for operating said pawls from a remote point.

In testimony whereof I affix my signature.

DAVID SCHON.